J. PAULU.
Vehicle Axle.
No. 230,433. Patented July 27, 1880.
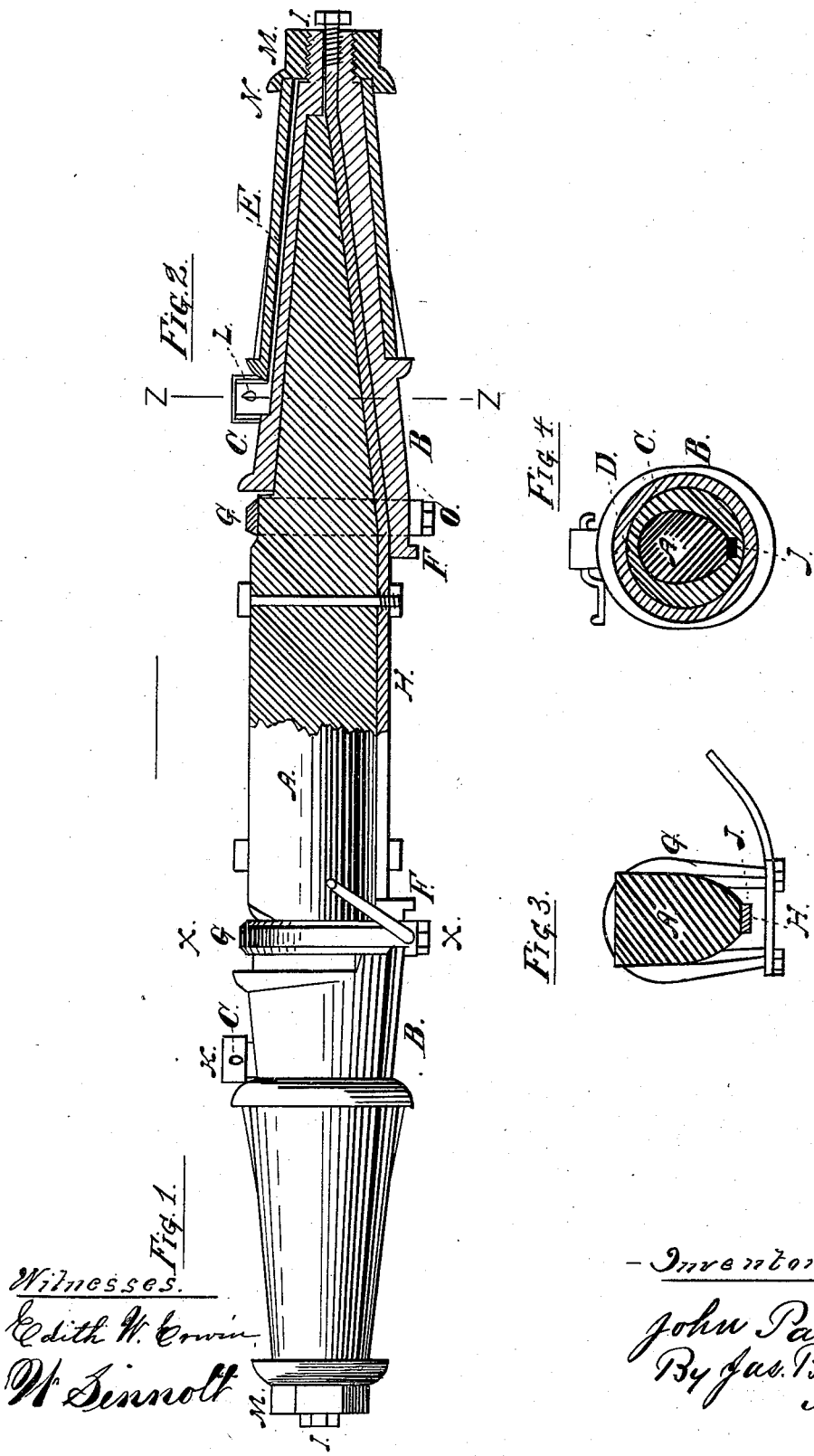

UNITED STATES PATENT OFFICE.

JOHN PAULU, OF MILWAUKEE, WISCONSIN.

VEHICLE-AXLE.

SPECIFICATION forming part of Letters Patent No. 230,433, dated July 27, 1880.

Application filed January 28, 1880.

*To all whom it may concern:*

Be it known that I, JOHN PAULU, a citizen of the United States, residing at Milwaukee, in the county of Milwaukee and State of Wisconsin, have invented certain new and useful Improvements in the Running-Gears of Wagons; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 represents a side view of my invention. Fig. 2 represents a vertical section of the same. Fig. 3 represents a cross-section at line $x$ $x$, Fig. 1. Fig. 4 represents a vertical cross-section at line $z$ $z$, Fig. 1.

My invention relates to improvements in the running-gear of wagons; and it consists more especially in the peculiar construction and arrangement of the axle-skein and lubricating-reservoir, all of which is further explained by reference to the accompanying drawings, in which like parts are indicated by the same reference-letters.

A is the wagon-axle. B B are the wagon-skeins, which are provided with lubricator-reservoirs C C, which are cast in one and the same piece with the skein.

D is a small opening or flue, through which the lubricant passes from the reservoir to the interior of the wagon hub or box E.

The lower side of the skeins B extends several inches, more or less, farther toward the center of the axle than the upper side, forming shank O, which is provided with a shoulder, F. The object of thus shaping the lower side of the skeins is to provide a strong and secure bearing for the clip or band G, by which band the skein is firmly secured to the axle. The skeins B are also respectively secured upon the axle by the bar H, (shown in Figs. 1 and 2,) which extends along the entire lower surface of the axle A, and past the ends of the axle through the ends of both of the skeins B, as shown, and is provided at its respective ends by nuts I I. By tightening either of the nuts I I the skeins are respectively drawn toward each other and held more firmly upon the axle.

The lower sides of the skeins are respectively provided with a recess or groove, J, for the reception of the bar H, which may be thus inserted without diminishing the size or strength of the axle.

K is a cover for the reservoir, which is secured in its place by key or pin L, which is inserted through corresponding holes in the respective edges of the cup and reservoir, as shown in Fig. 4.

M is a nut, which is screwed to the end of the skein B in the ordinary manner, and retains the wheel upon the axle. The inner surface of the nut M is provided with a flange, N, which projects over and surrounds the end of the box E, and thus more effectually prevents the escape of the lubricant from the axle than the ordinary nut, and also prevents dust and sand reaching the bearings.

Having thus described my invention, I do not claim, broadly, as my invention the nut M or the bar H as arranged to secure the skeins upon the respective ends of the axle, as I am aware that they are not new; but

What I claim as new, and desire to secure by Letters Patent, is—

The improved axle-skein herein described, provided with recess J and reservoir C, in combination with axle A and bar H, substantially as and for the purpose specified.

In testimony whereof I affix my signature in presence of two witnesses.

JOHN PAULU.

Witnesses:
JAS. B. ERWIN,
W. SINNOTT.